United States Patent [19]

Rawlings et al.

[11] 4,144,355

[45] Mar. 13, 1979

[54] METHOD FOR SEPARATING VEGETABLE WASTE SOLIDS FROM AQUEOUS SLURRIES OF VEGETABLE WASTE MATERIALS AND METHOD OF FEEDING THE SEPARATED SOLIDS TO RUMINANT ANIMALS

[75] Inventors: Robert M. Rawlings; Donald Procter, both of Boise, Id.

[73] Assignee: Blue Wing Corporation, Boise, Id.

[21] Appl. No.: 828,153

[22] Filed: Aug. 26, 1977

Related U.S. Application Data

[63] Continuation-in-part of Ser. No. 698,156, Jun. 21, 1976, abandoned, which is a continuation-in-part of Ser. No. 643,999, Dec. 22, 1975, abandoned.

[51] Int. Cl.$^2$ ............................ A23J 1/16; A23K 1/14
[52] U.S. Cl. ................................... 426/2; 210/47; 210/53; 426/573; 426/615; 426/635; 426/637; 426/495; 426/807
[58] Field of Search ............... 426/495, 472, 635, 637, 426/573, 271, 2, 615, 489, 807; 210/27, 52, 56, 62, 53, 47

[56] References Cited

U.S. PATENT DOCUMENTS

| | | | |
|---|---|---|---|
| 2,641,547 | 6/1953 | Evans | 426/589 |
| 2,900,335 | 8/1959 | Bravos et al. | 127/32 |
| 3,078,187 | 2/1963 | Bravos et al. | 127/33 |
| 3,372,111 | 3/1968 | Vahlsing, Jr. | 210/62 X |
| 3,578,497 | 5/1971 | Hjermstad | 426/573 |
| 3,586,627 | 6/1971 | Gooch | 426/495 |
| 3,649,292 | 3/1972 | Quame | 426/635 |
| 4,035,516 | 7/1977 | Jungvid | 426/2 |

OTHER PUBLICATIONS

Japanese Patent Application, 48-104347, (1973), Sugiyama et al.; published (12-27-1973).
Water Pollution Control Federation Journal; vol. 47, No. 6, (Jun. 1975), pp. 1389-1394.
"Utilization of Fats in Poultry and Other Livestock Feeds;" U.S. Dept. of Agriculture; Washington, D. C., pp. 1-2, (8-1960).
Richter et al.; "Conditioning and Disposal of Solids from Potato Wastewater Treatment;" *Journal of Food Science*; vol. 38; 1973.
Abstract No. 6264; Sewage and Wastes, vol. 75; 1971.

*Primary Examiner*—S. Leon Bashore
*Assistant Examiner*—Steve Alvo
*Attorney, Agent, or Firm*—Richards, Harris & Medlock

[57] ABSTRACT

A method for separating solids from aqueous waste slurries of vegetable processing plants by adjusting the pH of the slurries to at least 11.7. When the slurry has a pH of at least 11.7 a gel will be formed. The gel has admixed therewith about 2 to 6 weight percent based upon the weight of the gel of a calcium halide to induce syneresis, thereby aggregating the solid constituents contained within the mixture. The aggregate thus formed is separated from water exuded by the calcium halide synerist. The separated aggregate can be used in a ration for feeding ruminant animals.

29 Claims, No Drawings

METHOD FOR SEPARATING VEGETABLE WASTE SOLIDS FROM AQUEOUS SLURRIES OF VEGETABLE WASTE MATERIALS AND METHOD OF FEEDING THE SEPARATED SOLIDS TO RUMINANT ANIMALS

BACKGROUND OF THE INVENTION

This is a continuation-in-part of U.S. patent application Ser. No. 698,156, filed June 21, 1976 and now abandoned, which is a continuation-in-part of U.S. patent application Ser. No. 643,999, filed Dec. 22, 1975 and now abandoned.

This invention relates to waste streams of vegetable processing plants. One aspect of the invention relates to a process for treating aqueous slurries of vegetable waste materials containing starch and protein. Another aspect of the invention relates to an efficient, economical, and environmentally acceptable method of removing suspended solids from the vegetable-containing slurries produced in vegetable processing plants. A further aspect of the invention relates to an improved method for feeding ruminant animals whereby the animals are fed a dried particulate feed obtained from the aqueous waste slurries of vegetable processing plants.

Numerous problems have been encountered in the disposal of waste slurries generated by vegetable processing plants. Because of environmental regulations, slurries containing solid vegetable waste can no longer be discharged directly to sewers or open streams. The industry has therefore directed much effort toward economical and environmentally acceptable ways of disposing of this waste. Standard filtering means such as screening, flotation, and sedimentation are helpful in removing large particles of solids, but are not adequate for removing the smaller particles entrained in the slurries. Secondary treatment processes utilizing biological oxidation have been employed in an attempt to remove the the smaller particles. Other efforts have been directed toward the development and use of electrolysis as a method of removing waste solids from the aqueous slurries. However, the time and expense required for these processes have prevented widespread use. A waste treatment system providing a workable method of removing particulate solids while producing a salable product is therefore needed. An efficient method of removing the particulate solids will enable vegetable processing plants to reduce the size of their water treatment facilities and the amount of make up water required. The waste slurries produced during potato processing are illustrative of those typically encountered within the industry.

The two principal waste streams emanate from a potato processing plant. One is commonly called the "dry peel" stream and typically contains from 12% to 18% by weight solids. The "dry peel" waste stream results from dry caustic peeling of the potatoes. The dry caustic peeling process is lye peeling method that uses very little water. According to the dry caustic peeling method, the surface tissue is softened by the action of lye and heat, and then removed as a semi-solid material by the scrubbing action of rotating, rubber tipped rolls. Very little, if any, water is used in the scrubber where approximately 85% to 90% of the peel is removed. Because this is done with a caustic solution, the dry peel normally has a rather high pH.

The other effluent stream is the so-called "clarifier waste." This material is obtained from the vacuum filter which processes material from the bottom of the clarifier. It typically contains from about 3.5% to about 6% by weight solids. Whereas the dry peel has a starch content ranging from about 4% to about 5% in solution, the starch content of the clarifier waste is about 1%.

Some previous attempts have been made to employ recovered potato waste solids as animal feed supplements. The major portion of the feed is known as "filter cake," the product recovered by rotary vacuum filtering the slurry from a sedimentation tank. At present, however, the industry has no satisfactory way to handle clarifier waste containing from about 3.5% to about 6% solids.

The dry peel waste containing from about 12% to about 18% by weight solids has been sold by the industry, in slurry form, as feed for animal feed lots. These slurries are typically hauled to the feed lot and placed in pits. Thereafter, a biological starter or acid material is incorporated into the slurry to lower its pH to a level acceptable for use in an animal feed material. This method of handling the dry peel waste is inefficient for several reasons. First, biological agents used to stabilize the waste material consume a portion of the nutrients contained therein as their own food source. Second, problems of stratification of the slurry in the pits have been encountered, resulting in difficulties in loading the feed product and in providing a uniform feed. Third, problems have been encountered in transporting the slurry due to the large excess of water. Thus, it is desirable that a new process be developed which can readily separate suspended solids from vegetable waste slurries. The present invention is directed to such a process.

SUMMARY OF THE INVENTION

This invention provides a novel process for separating solids from aqueous slurries of vegetable waste materials. Furthermore, this invention will permit solids to be separated from the aqueous waste slurries of vegetable processing plants in an efficient, economical and environmentally acceptable manner.

According to one embodiment of the invention a novel process is provided for separating solids from an aqueous slurry of vegetable waste material whereby the slurry is adjusted to a pH of at least about 11.7, if necessary, admixed with a calcium halide synerist, and maintained for sufficient time to allow at least about half the water to exude therefrom. The exudate is then separated from the solid aggregate by any suitable means such as filtering, centrifuging, or pressing.

According to another embodiment of the invention, a method is provided whereby the aggregate produced according to the first embodiment is treated with a mineral acid and then fed to ruminant animals as a feed supplement.

DETAILED DESCRIPTION OF THE INVENTION

According to the present invention, aqueous slurries of solid vegetable wastes can be treated individually or combined in accordance with the present invention. The particular procedure to be employed will vary according to the type of vegetable being processed, the type and efficiency of equipment utilized in the processing operations, and the permissible level of solids in the discharged effluent.

The term "aqueous slurry" is used herein to mean any one or a combination of aqueous streams used to clean, wash or condition the processed or culled vegetables which contain solid waste, known as waste slurries, or an aqueous slurry of the product itself. For purposes of this invention the term "vegetable" is understood to have a generic meaning including all members of the vegetable kingdom containing starch and protein. Such slurries will have a solids content ranging from about 3.5 to about 18% by weight. Preferred embodiments of this invention relate to aqueous slurries containing potato, onion, or beet solids.

The aqueous waste slurries emanating from a vegetable processing plant will have varying pH levels, depending upon the particular treatment employed. For example, the slurry resulting from the dry peeling operation in a potato processing plant will have a pH of around 12.7, whereas the filtrate slurry from a sedimentation tank, commonly known as clarifier waste, will ordinarily have a pH ranging from about 3.5 to about 6.

In order to recover suspended solids from the aqueous potato waste slurry using the method of the present invention, the pH of the slurry is determined and, when required, the slurry is treated with an effective amount of a caustic material to adjust the pH of the slurry to a level of at least 11.7, and preferably from about 12 to about 12.7. Adjusting the pH to this level will result in the formation of a gel containing the suspended solids. Any suitable caustic material can be employed in adjusting the pH of the slurry. Examples of suitable caustics are the alkali metal and alkaline earth metal hydroxides. Preferred caustics for use with the present invention are sodium hydroxide and potassium hydroxide. The preferred caustics are especially desirable where it is intended to utilize the recovered solids as an animal feed supplement.

Once the pH level of the vegetable waste slurry has been determined to be at least 11.7 and a gel has been formed, an effective amount of a synerist is admixed into the gel for a sufficient period of time to ensure complete dispersion. As used herein, the term "synerist" means any substance capable of inducing syneresis. Syneresis is the contraction of a gel on standing, with exudation of liquid. While the amount of synerist can vary, desirable results have been obtained when the synerist is employed in an amount ranging from about 2% to about 6% of the total weight of the gel. After the synerist has been added, the treated gel is allowed to remain at ambient temperatures for a period effective to allow syneresis to occur. The aggregate resulting from syneresis contains most of the solid constituents of the aqueous slurry of vegetable waste. If desired, the treated gel can be maintained under quiescent conditions during syneresis. The term "aggregate" means the agglomeration of solid particles previously entrained in the aqueous slurry that remain after syneresis of the gel. Examples of synerists suitable for use in the present invention are the calcium halides, and preferably calcium chloride. In addition, other suitable synerists can be employed provided that they are water soluble and induce syneresis of the gel to form an aggregate of the solid constituents of the aqueous slurries. Further, calcium chloride can be formed in situ by first utilizing calcium hydroxide to adjust the pH of the aqueous slurry vegetable waste and thereafter admixing hydrochloric acid with the pH-adjusted slurry to form the calcium chloride synergist.

After syneresis, the aggregate is removed from the exudate by any suitable means such as filtering, centrifuging, or pressing. The exudate can then be tested to determine its suitability for recycling within the processing plant or discharge into a sewer. In either situation, it is desirable to determine the salt content of the effluent water, as well as the amount of solids which may still be entrained therein. If desirable, the water can be treated by a passage through an ion exchange column to remove any dissolved mineral salts.

After separating the exudate, the aggregate can be utilized as an animal feed supplement either in that form or after drying to a free-flowing particulate. It is desirable to adjust the pH of the animal feed supplement downward by dilution with other components of the feed itself or by acidification. The feed supplement of the subject invention when fed alone or a feed ration containing said feed supplement should preferably have a pH of no greater than about 9. The most preferred pH should range from about 3 to about 9. Preferred mineral acids for this purpose include hydrochloric acid, phosphoric acid, and the like. Phosphoric acid is an especially desirable pH adjusting agent because of its nutrient value and the desirability of obtaining a proper calcium-phosphorus balance in the feed supplement.

The feed supplement produced from an aqueous vegetable waste slurry is primarily a mixture of carbohydrates and proteins. When desired, additional proteins and additives such as vitamins or lipids can readily be incorporated into the feed supplement by various methods. According to one embodiment, vitamins, lipids, medicaments, and the like can be admixed with the aqueous vegetable slurry prior to the addition of the synerist. By incorporating such constituents into the slurry prior to the addition of the synerist, the aggregate thereby formed will contain the desired additives. Whether the feed supplement is used in the aggregate form or dried to a granular, free-flowing particulate form, the additives will remain therein.

According to another embodiment, additives can be incorporated into the feed supplement produced from an aqueous vegetable slurry by redissolving the aggregate material in an aqueous caustic solution, admixing the desired amounts of additives, and thereafter recovering the feed supplement by processes well known to the industry. Such processes may include precipitation, evaporation, and the like.

The lipids which can be incorporated into the feed supplement produced from the aqueous vegetable slurries by the present invention can be either saturated or unsaturated. Suitable lipids include animal fats and those obtained from sunflowers, safflowers, peanuts, soybeans, cotton, maize, rape, and the like. Such lipids are well known in the art.

The feed supplement of the subject invention is normally fed as about 10% of the total ration to a ruminant animal; however, if desired it can constitute 20% or more of the animal's total ration.

The following Examples are set forth in order to more fully describe the present invention:

EXAMPLE 1

A gel consisting of 98 grams of an aqueous potato waste slurry containing 13 weight percent solids and having a pH of 12.7 was placed into a beaker. Thereafter, 2 grams of anhydrous calcium chloride flakes were added to the gel and the resulting mixture was stirred for about 2 minutes. The mixture was then allowed to remain under quiescent conditions at ambient temperature for about 20 minutes to allow the solid constituents in the gel to agglomerate. It was noted that after about 1¼ minutes, the solid constituents began to agglomerate, indicating the onset of syneresis. Once syneresis was complete, the aggregate was placed into a muslin cloth and squeezed by hand to remove the exudate therefrom. 70 milliliters of water were removed from the aggregate, representing 80.5% of the entrained water. The material remaining in the cloth was an aggregate containing most of the solids originally present in the gel.

EXAMPLE 2

A gel consisting of 400 grams of potato waste slurry containing 13 weight percent solids and having a pH of 12.7 was placed into a beaker. Thereafter, 35 grams of tallow was added to the gel and the mixture was passed through a stone mill for a sufficient time to allow the formation of an emulsion. The tallow was heated to about 45 degrees C. when added to the gel to facilitate its dispersion therein. After emulsification, 16 grams of anhydrous calcium chloride was added to the emulsion. The treated emulsion was stirred by hand for about 2 minutes to ensure complete dispersion of the calcium chloride. Once the calcium chloride had been incorporated into the emulsion, the emulsion agglomerated and showed signs of syneresis. The aggregate was allowed to stand and thereafter placed into a muslin cloth and squeezed by hand to remove the water. 225 milliliters of water was removed in this manner, representing 64.65% of the entrained water. The aggregate was thereafter dried, resulting in a granular, free-flowing particulate. The particulate was inspected and no signs of free fat were apparent.

EXAMPLE 3

A sample of potato clarifier waste was divided into 2 aliquots. 1 aliquot was adjusted to a pH of about 9 and thereafter admixed with 2% by weight calcium chloride. The second aliquot was raised to a pH of about 12 and thereafter admixed with 2% calcium chloride. Both aliquots were permitted to stand undisturbed during syneresis. Afterwards, the water was separated from the aggregate of each aliquot and measured. Only 30% of the entrained water was exuded from the first aliquot, whereas over 60% of the entrained water was exuded from the second. In order to effect the desired separation, it is necessary that at least 50% of the water be exuded by the action of the synerist.

EXAMPLE 4

In this experiment, 6 samples of a dry peel slurry were prepared, each containing about 13 weight percent solids entrained in 87 milliliters of water. Different amounts of calcium chloride were added to each of the 6 samples and stirred into the slurry. After syneresis, the exudate was separated from the aggregate by pressing through a wet cloth, and the amount of exudate was measured and recorded. The results were as follows:

Sample 1 — 1 Weight percent of anhydrous commercial grade calcium chloride that had not been presolubilized was stirred into the sample. 25 Milliliters of very dirty and turbid exudate were obtained.

Sample 2 — 1.5 Weight percent of anhydrous commercial grade calcium chloride was stirred into the sample. 32 Milliliters of very dirty, turbid exudate were obtained.

Sample 3 — 2 Weight percent of anhydrous commercial grade calcium chloride were stirred into the sample. 50 Milliliters of dirty exudate were obtained.

Sample 4 — 3 Weight percent of anhydrous commercial grade calcium chloride was stirred into the sample. 55 Milliliters of dirty exudate were obtained. It was noted that the exudate obtained from samples 3 and 4 was eminently clearer than that of sample 1 and 2.

Sample 5 — 2 Weight percent of calcium chloride in the form of a 10 weight percent solution in 20 milliliters of water was added to the sample. 67 Milliliters of dirty exudate were obtained.

Sample 6 — 2 Weight percent calcium chloride in the form of a 20 weight percent solution (10 milliliters of water) was added to the sample. 60 Milliliters of exudate were obtained.

EXAMPLE 5

The experiments of Example 4 were repeated with a potassium chloride synerist, but were not successful in achieving separation of an aggregate and exudate.

EXAMPLE 6

The experiments of Example 4 were repeated using a sodium chloride synerist, but were not successful in achieving separation of an aggregate and exudate.

EXAMPLE 7

3 Samples of a dry peel slurry were prepared according to the method of Example 4. 2, 3, and 6 grams of magnesium chloride hexahydrate were added to the 3 samples, amounting to 1%, 1.5% and 3% by weight, respectively. Each sample was thoroughly mixed and then filtered from a nylon cloth. The first sample yielded 25 milliliters of water; the second sample yielded 29 milliliters of water; and the third sample yielded 35 milliliters of water. Since the exudate yields amounted to less than 50% of the entrained water, the magnesium chloride hexahydrate was not considered to be an acceptable synerist.

EXAMPLE 8

207 Grams of onion waste in 50 grams water, and 2 grams of sodium hydroxide, were homogenized in a Waring blender to form a smooth creamy texture. 100 grams of this material was then contacted with 2 grams of calcium chloride. The onion waste syneresed and 73 grams of water was removed by squeezing the sample in a muslin cloth. This demonstrated the effectiveness of calcium chloride for separating the solids contained in onion waste slurries.

As will be apparent to those of ordinary skill in the art upon reading the present disclosure, many alterations, substitutions and equivalents may be applicable to the various disclosed embodiments of the invention. It is the intent, however, that the concepts disclosed herein be limited only by the appended claims.

We claim:
1. A process for separating vegetable waste solids from an aqueous slurry of vegetable waste materials which has a solids content in the range of from about 3.5% to about 18% by weight comprising:
 (a) adjusting the pH of the slurry to at least about 11.7 to thereby gel said slurry;
 (b) admixing with said gelled slurry about 2 to about 6 weight percent based upon said gelled slurry of a calcium halide synerist;

(c) maintaining the admixture for an effective period of time to exude at least about one-half of the water therefrom to thereby form an aggregate; and (d) separating the exuded water from the aggregate thus formed.

2. The process of claim 1 wherein the vegetable waste contains starch and protein.

3. The process of claim 1 wherein the vegetable waste is selected from the group consisting of potatoes, onions and beets.

4. The process of claim 1 wherein the pH of the aqueous slurry of vegetable waste is adjusted by the addition of a caustic agent selected from the group consisting of the alkali metal and alkaline earth metal hydroxides.

5. The process of claim 4 wherein the caustic agent is calcium hydroxide.

6. The process of claim 1 wherein the calcium halide synerist is selected from the group consisting of calcium chloride, calcium iodide, and calcium bromide.

7. The process of claim 6 wherein the calcium halide synerist is calcium chloride.

8. The process of claim 1 wherein the calcium chloride is formed in situ by first utilizing calcium hydroxide to adjust the pH of the aqueous slurry of vegetable waste to at least about 11.7, and then admixing hydrochloric acid with the pH-adjusted gel to form the calcium chloride synerist therewithin.

9. The process of claim 1, including the additional step of admixing an effective amount of a mineral acid with the separated aggregate to lower the pH of the aggregate to not more than about 9.0.

10. The process of claim 9 wherein the mineral acid is selected from the group consisting of hydrochloric acid and phosphoric acid.

11. The method of claim 9 further comprising:
(a) forming a ruminant animal food ration containing said pH adjusted aggregate
(b) feeding effective dietary amounts of said ration to ruminant animals; and
(c) allowing the ration to be assimilated by said ruminant animals.

12. The process of claim 1, including the additional step of drying the separated aggregate to form a free-flowing, solid particulate product.

13. The process of claim 1, including the additional step of admixing additives within the slurry prior to addition of the synerist.

14. The process of claim 13 wherein the additives are selected from proteins, vitamins, lipids and medicaments.

15. The process of claim 1 including the further steps of redissolving the aggregate material in an aqueous caustic solution, admixing additives therewith, and then recovering the aggregate.

16. The process of claim 15 wherein the additives are selected from proteins, vitamins, lipids and medicaments.

17. A process for removing vegetable waste solids from an aqueous gel of vegetable waste material having a solids content of between about 3.5 and 18% by weight and a pH of at least 11.7 comprising:
(a) admixing with said gel from about 2 to about 6% by weight of said gel of a calcium halide synerist;
(b) maintaining the admixture for an effective period of time to exude at least one-half of the water therefrom to thereby form an aggregate; and
(c) separating the exuded water from the aggregate thus formed.

18. The process of claim 17 wherein the vegetable waste contains starch and protein.

19. The process of claim 17 wherein the vegetable waste is selected from the group consisting of potatoes, onions and beets.

20. The process of claim 17 wherein the calcium halide synerist is selected from the group consisting of calcium chloride, calcium iodide and calcium bromide.

21. The process of claim 20 wherein the calcium halide synerist is calcium chloride.

22. The process of claim 17, including the additional step of admixing an effective amount of a mineral acid with the separated aggregate to lower the pH thereof to not more than about 9.0.

23. The process of claim 22 wherein the mineral acid is selected from the group consisting of hydrochloric acid and phosphoric acid.

24. The method of claim 22 further comprising:
(a) forming a ruminant animal food ration containing said pH adjusted aggregate
(b) feeding effective dietary mounts of said ration to ruminant animals; and
(c) allowing the ration to be assimilated by said ruminant animals.

25. The process of claim 17, including the additional step of drying the separated aggregate to form a free-flowing, solid particulate product.

26. The process of claim 17, including the additional step of admixing additives within the gel prior to addition of the synerist.

27. The process of claim 26 wherein the additives are selected from proteins, vitamins, lipids and medicaments.

28. The process of claim 17 including the further steps of redissolving the aggregate material in an aqueous caustic solution, admixing additives therewith, and then recovering the aggregate.

29. The process of claim 28 wherein the additives are selected from the group consisting of proteins, vitamins, lipids and medicaments.

* * * * *